United States Patent
Son et al.

(10) Patent No.: US 10,025,126 B2
(45) Date of Patent: Jul. 17, 2018

(54) DISPLAY DEVICE

(71) Applicant: Samsung Display Co., Ltd., Yongin-si, Gyeonggi-do (KR)

(72) Inventors: Myoungseok Son, Yongin-si (KR); Kwangwook Choi, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 153 days.

(21) Appl. No.: 15/084,693

(22) Filed: Mar. 30, 2016

(65) Prior Publication Data

US 2016/0363804 A1 Dec. 15, 2016

(30) Foreign Application Priority Data

Jun. 11, 2015 (KR) ........................ 10-2015-0082698

(51) Int. Cl.
*G02F 1/1333* (2006.01)

(52) U.S. Cl.
CPC .... *G02F 1/133308* (2013.01); *G02F 1/13336* (2013.01); *G02F 2001/133317* (2013.01)

(58) Field of Classification Search
None
See application file for complete search history.

(56) References Cited

U.S. PATENT DOCUMENTS

| | | | | |
|---|---|---|---|---|
| 2001/0050732 A1* | 12/2001 | Okamoto | ......... | G02F 1/133308 349/58 |
| 2002/0008804 A1* | 1/2002 | Ogawa | ............. | G02F 1/133308 349/58 |
| 2003/0123019 A1* | 7/2003 | Kim | .................. | G02F 1/133305 349/158 |
| 2006/0133018 A1* | 6/2006 | Okuda | ............. | G02F 1/133308 361/679.26 |
| 2009/0262554 A1* | 10/2009 | Lee | .................. | G02F 1/133308 362/633 |
| 2009/0290117 A1* | 11/2009 | Watanabe | ......... | G02F 1/133305 349/153 |
| 2013/0027857 A1* | 1/2013 | Jeong | ................ | G02F 1/133308 361/679.01 |
| 2013/0278859 A1* | 10/2013 | Pan | .................. | G02F 1/133608 349/58 |
| 2014/0104538 A1* | 4/2014 | Park | ................. | G02F 1/133608 349/60 |

(Continued)

FOREIGN PATENT DOCUMENTS

KR 10-0960165 B 5/2010
KR 1020130013041 A 2/2013

(Continued)

*Primary Examiner* — Ryan Crockett
(74) *Attorney, Agent, or Firm* — Cantor Colburn LLP (57) ABSTRACT

A display device includes: a display panel including a first display substrate and a second display substrate opposing each other and a sealant which couples the first and second display substrates to each other; a first frame member overlapping an edge portion of the display panel; and a second frame member at the edge portion of the display panel and on a rear surface of the display panel. The first frame member defines a fixing portion thereof overlapping an edge portion of the first display substrate of the display panel, and a side wall portion thereof extended bent downwards from the fixing portion.

16 Claims, 5 Drawing Sheets

(56) References Cited

U.S. PATENT DOCUMENTS

| | | | |
|---|---|---|---|
| 2014/0327855 A1* | 11/2014 | Tang | G02F 1/133308 349/58 |
| 2015/0116609 A1* | 4/2015 | Arita | G02F 1/13338 349/12 |
| 2016/0370530 A1* | 12/2016 | Shimizu | G02B 6/0083 |

FOREIGN PATENT DOCUMENTS

| | | |
|---|---|---|
| KR | 1020130046240 A | 5/2013 |
| KR | 1020140072634 A | 6/2014 |

* cited by examiner

DISPLAY DEVICE

This application claims priority to Korean Patent Application No. 10-2015-0082698, filed on Jun. 11, 2015, and all the benefits accruing therefrom under 35 U.S.C. § 119, the content of which in its entirety is herein incorporated by reference.

BACKGROUND

1. Field

Exemplary embodiments of the invention relate to a display device having a narrow bezel.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme thereof.

The display device may include a display panel which displays images and includes a plurality of pixels disposed therein, a driving printed circuit board ("PCB") at one side of the display panel, and a chip on film ("COF") or a tape carrier package ("TCP") connecting the display panel and the driving PCB to each other. The COF and the TCP may each include a panel-shaped material that is relatively thin and bendable on which a circuit wiring is disposed such that an electric signal of the driving circuit board is applied to the display panel through the COF and the TCP.

In general, the PCB is closely disposed on a side surface of a mold frame of a display device or a rear surface of a bottom chassis of a display device so as to reduce an overall volume of the display device. To dispose the PCB close to the mold frame or the bottom chassis, the COF or the TCP connecting the display panel and the PCB to each other are disposed bent along the side surface of the mold frame. Where the COF or the TCP is bent along the side surface of the mold frame, a top chassis of the display device may be provided to protect the COF or the TCP disposed on the side surface of the mold frame.

Multi-display devices in which a plurality of display devices is combined in a tiling manner to realize a single relatively large screen are in use so as to convey various types of information and advertisement. As for a multi-display device, reducing a non-display area between respective display devices constituting the multi-display device is critical so that an overall single screen may be perceived.

Accordingly, in each of the display devices within the multi-display device, the non-display area at an edge portion of display panels of the display devices is designed to be minimized.

SUMMARY

One or more exemplary embodiments of the invention are directed to a display device having a significantly reduced (e.g., minimized) non-display area thereof.

According to an exemplary embodiment of the invention, a display device includes: a display panel including a first display substrate and a second display substrate opposing each other and a sealant which couples the first and second display substrates to each other; a first frame member overlapping an edge portion of the display panel; and a second frame member at the edge portion of the display panel and on a rear surface of the display panel. The first frame member defines a fixing portion thereof overlapping an edge portion of the first display substrate of the display panel, and a side wall portion thereof extended bent downwards from the fixing portion.

The display device may further include a bottom chassis on which the second frame member is disposed, and a first adhesive member between the side wall portion and at least one of the second frame member and the bottom chassis.

The display device may further include a second adhesive member between the fixing portion and at least one of the first display substrate and the second display substrate.

At the edge portion of the display panel, at least one of the first display substrate and the second display substrate may have a reduced thickness thereof, and the reduced thickness contacts the fixing portion overlapping the edge portion of the first display substrate of the display panel.

A total thickness of the first frame member may be about 0.1 millimeter (mm) or more.

The first frame member may be disposed outside the sealant which couples the first and second display substrates to each other.

The display panel may define the edge portion thereof in plural, and the first frame member may be provided in plural respectively at the edge portions of the display panel.

The first frame member may further define a hemming portion extending from the side wall portion of the first frame member toward the second frame member to be disposed between the side wall portion of the first frame member and the second frame member.

The display device may further include a backlight unit which is below the display panel and generates and provides light to the display panel.

The display device may further include a coupling member which couples the first frame member and the second frame member to each other.

The second frame member may define a groove in which the coupling member is received, and the coupling member may be a screw.

The second frame member may define the coupling member as a coupling hook, and the first frame member may define a coupling hole in which the coupling hook is received.

The foregoing is illustrative only and is not intended to be in any way limiting. In addition to the illustrative embodiments, and features described above, further embodiments, and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The spatially relative terms "below," "beneath," "lower," "above," "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
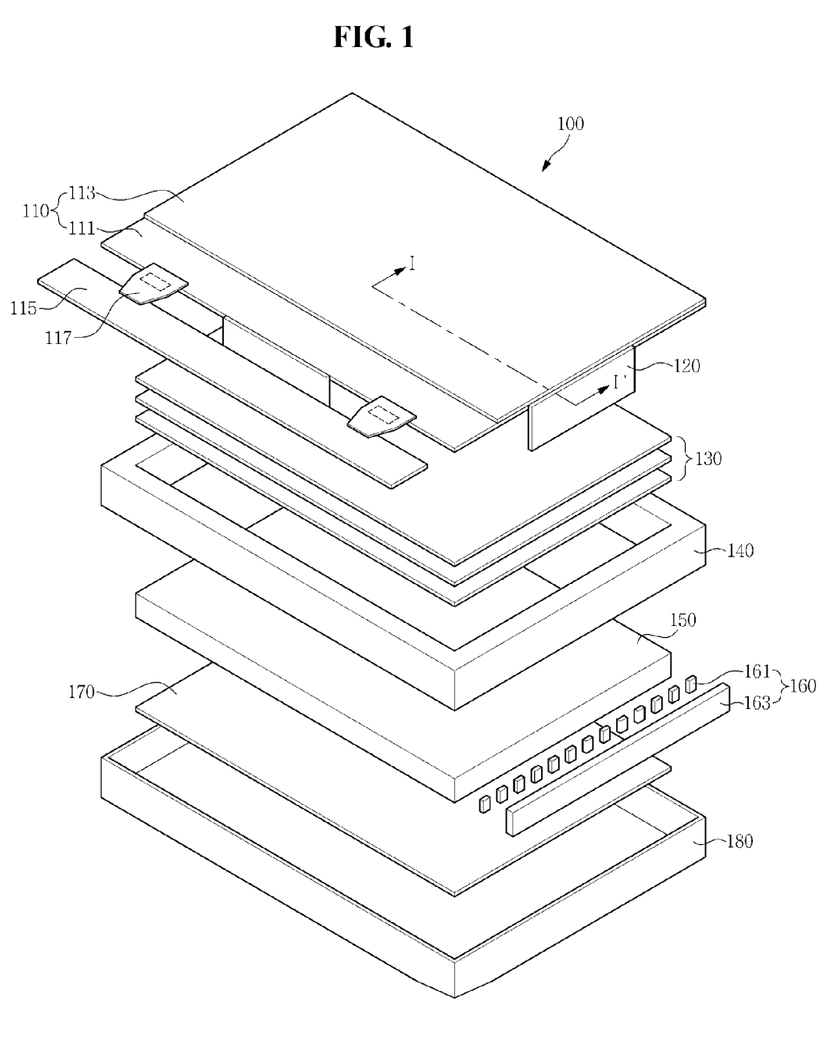
FIG. 1 is a schematic exploded perspective view illustrating an exemplary embodiment of a display device according to the invention.
Figure 2:
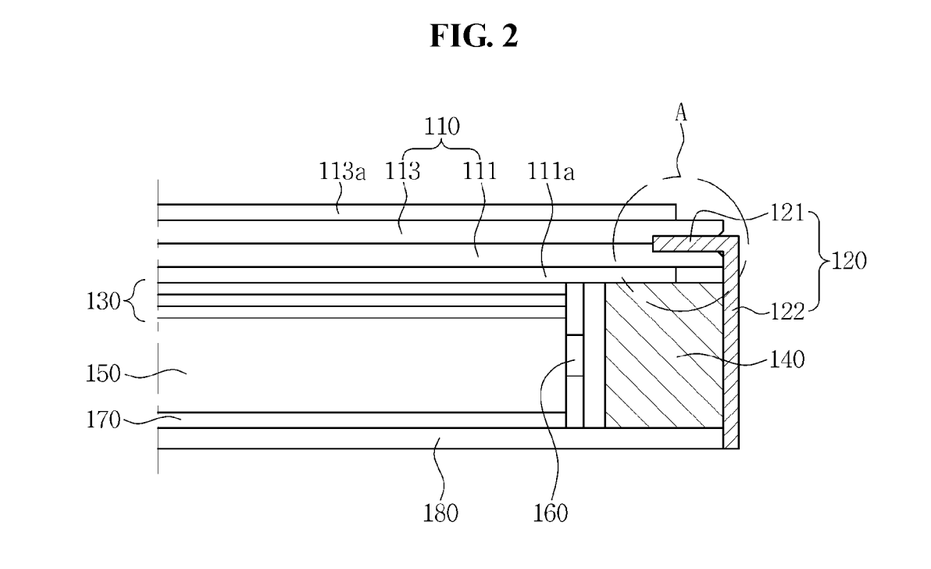
FIG. 2 is a cross-sectional view taken along line I-I' of FIG. 1.

FIG. 1 is a schematic exploded perspective view illustrating an exemplary embodiment of a display device 100 according to the invention; and FIG. 2 is a cross-sectional view taken along line I-I' of FIG. 1.

In reference to FIGS. 1 and 2, the display device 100 includes a display panel 110, a first frame member 120, an optical sheet 130, a second frame member 140, a light guide plate 150, a light source unit 160, a reflective sheet 170 and a bottom chassis 180.

Hereinafter, the optical sheet 130, the second frame member 140, the light guide plate 150, the light source unit 160, the reflective sheet 170 and the bottom chassis 180 are collectively referred to as a backlight unit.

The display panel 110 may be provided in a quadrilateral panel form that may display images using light. The display panel 110 may use various display panels including but not limited to a liquid crystal display ("LCD") panel, an electrophoretic display panel, and the like. The display panel 110 according to the exemplary embodiment may be described with respect to the LCD panel 110.

Figure 3:
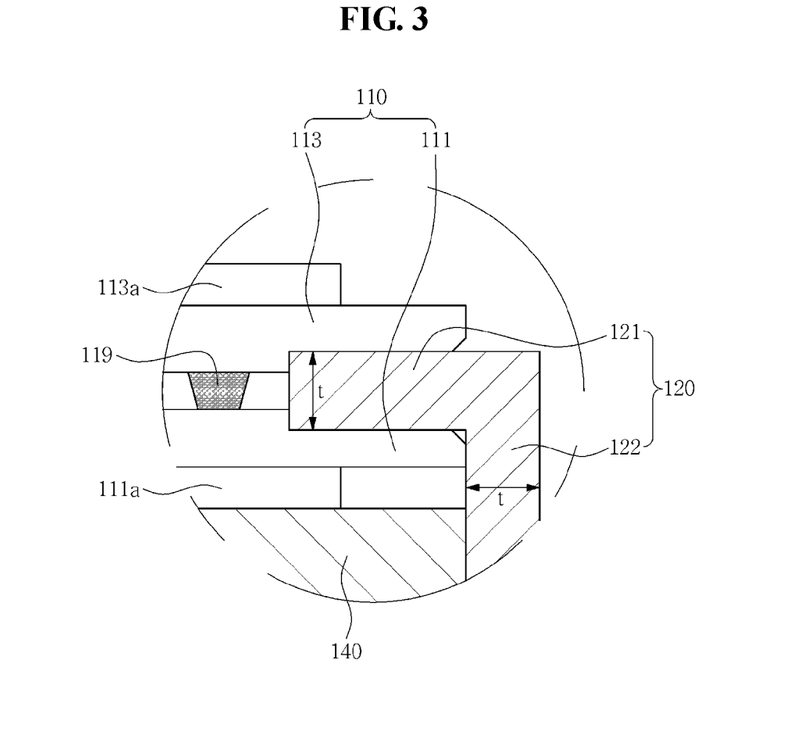
FIG. 3 is a partial enlarged view illustrating an exemplary embodiment of portion "A" of FIG. 2.

FIG. 3 is a partial enlarged view illustrating portion "A" of FIG. 2;

In reference to FIG. 3, the display panel 110 includes a first display substrate 111, a second display substrate 113 opposing the first display substrate 111, and a liquid crystal layer (not illustrated) between the first display substrate 111 and the second display substrate 113.

The first display substrate 111 includes a plurality of pixel electrodes arranged in a matrix form, thin film transistors configured to apply a driving voltage to the respective pixel electrodes, and various signal lines configured to drive the pixel electrodes and the thin film transistors, on a first base substrate.

The second display substrate 113 is disposed to oppose the first display substrate 111 and includes a common electrode including a transparent conductive material and a color filter, on a second base substrate. The color filter includes a red color filter, a green color filter and/or a blue color filter but is not limited thereto.

In reference to FIG. 3, at least one of the first display substrate 111 and the second display substrate 113 may have a relatively smaller thickness at a portion contacting a fixing portion 121 of the first frame member 120. The first frame member 120 may be provide in singular at respective edge portions of the display panel 110, but the number of the first frame members 120 is not limited thereto. Although not visible in FIG. 1, the frame member 120 may be provided at each of four respective edge portions of the display panel 110.

The liquid crystal layer (not illustrated) is disposed between the first display substrate 111 and the second display substrate 113, and orientations thereof may be rearranged by an electric field formed between the pixel electrodes and the common electrode. Accordingly, the rearranged liquid crystal layer (not illustrated) controls transmittance of light therethrough emitted from the backlight unit, and the controlled light may pass through the color filter to display an image outwards of the display device. The liquid crystal layer (not illustrated) may be sealed within the display panel 110 by a sealant.

In addition, a lower polarizer 111a may be disposed on a rear surface of the first display substrate 111, and an upper polarizer 113a may be disposed on an upper surface of the second display substrate 113. The upper polarizer 113a and the lower polarizer 111a may have a planar area corresponding to the display panel 110. The upper polarizer 113a may transmit light of a predetermined polarization among light being externally incident thereto and may absorb or block other light. The lower polarizer 111a may transmit light of a predetermined polarization among light emitted from the backlight unit and incident thereto and may absorb or block other light.

A driving circuit board 115 may further be disposed at least at one side of the display panel 110. The driving circuit board 115 may apply a driving signal to various signal lines in the first display substrate 111. The driving circuit board 115 may collectively include a gate driving circuit board 115 applying a scan signal and a data driving circuit board 115 applying a data signal. In FIG. 1, one driving circuit board 115 is depicted as being disposed at only one side of the display panel 110, but the invention is not limited thereto. In an exemplary embodiment, the gate driving circuit board 115 applying a scan signal and the data driving circuit board 115 applying a data signal may be disposed at two different sides of the display panel 110.

The display panel 110 and the driving circuit board 115 may be electrically connected to each other by at least one flexible printed circuit board ("FPCB") 117. A first end portion of the FPCB 117 overlaps a portion of the first display substrate 111 to be electrically connected thereto, and a second end portion thereof opposite to the first end portion overlaps a portion of the driving circuit board 115 to be electrically connected thereto. The FPCB 117 may be a chip on film ("COF") or a tape carrier package ("TCP"). Hereinafter, the FPCB 117 will be described with respect to the COF. While two FPCBs 117 are provided in FIG. 1, the invention is not limited thereto. The number of the FPCBs 117 may vary based on the size and the driving method of the display panel 110.

A driving chip (generally indicated by the dotted line rectangle in FIG. 1) may be mounted on the FPCB 117. The driving chip may generate various driving signals for driving the display panel 110. The driving chip refers to a chip into which a timing controller and a data driving circuit are integrated, and may be referred to as a driver integrated circuit ("IC") board or a source IC board.

The plurality of FPCBs 117 attached at the one side of the display panel 110 may extend from the display panel 110 to be bent along a side wall of the second frame member 140 and/or the bottom chassis 180. The driving circuit board 115 disposed at a distal end of the FPCBs 117 may be disposed on the side wall and/or an edge portion of a rear surface of the bottom chassis 180.

Figure 4:
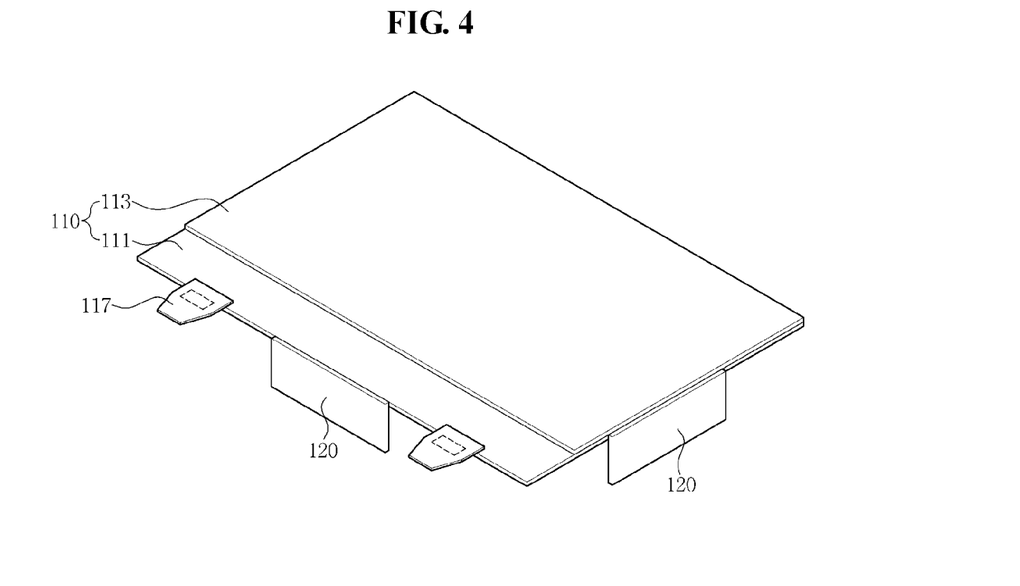
FIG. 4 is a perspective view illustrating an exemplary embodiment of a display panel according to the invention.

FIG. 4 is a perspective view illustrating an exemplary embodiment of the display panel 110 according to the invention.

In reference to FIGS. 3 and 4, the first frame member 120 is disposed on respective edge portions of the first display substrate 111.

The first frame member 120 includes a fixing portion 121 and a side wall portion 122 which extends from the fixing portion 121 and has a total thickness of at least about 0.1 millimeter (mm). The first frame member 120 may define the fixing portion 121 thereof and the side wall portion 122 thereof. Referring to FIG. 3, fixing portion 121 and side wall portion 122 have a total thickness of at least about 0.1 millimeter (mm).

Referring to FIG. 1 and FIGS. 1, 2 and 3, the first frame member 120 is disposed at a side of the display panel 110 at which edge portions of both the first and second display substrates 111 and 113 are disposed. The fixing portion 121 is disposed between the first display substrate 111 and the second display substrate 113, and disposed outwardly of a sealant 119 of the display panel 110. Referring again to FIG. 1, an edge portion of only the first display substrate 111 is disposed at the side of the display panel 110 at which the driving circuit board 115 is disposed. For the first frame member 120 at the side of the display panel 110 at which the driving circuit board 115 is disposed, the fixing portion 121 may overlap an upper surface of the first display substrate 111 and be exposed by the second display substrate 113.

In addition, the fixing portion 121 is attached to the display panel 110 such as using an adhesive member (not illustrated). The adhesive member (not illustrated) may be disposed between the fixing portion 121 and at least one of the first display substrate 111 and the second display substrate 113.

The adhesive member (not illustrated) may be at least one selected from polyester, an instant adhesive, a thermal adhesive, a solvent-type adhesive, a liquid glue and a double-sided tape. However, the invention is not limited thereto, and any of a number of materials that may serve adhesion may be employed.

The side wall portion 122 extends from the fixing portion 121 and is bent downwardly of the fixing portion 121.

The side wall portion 122 is attached to at least one of the second frame member 140 and the bottom chassis 180 such as by using an adhesive member (not illustrated) interposed therebetween. Referring to FIG. 2 and FIG. 3, for example, the adhesive may be disposed between an inner surface of the side wall portion 122 and an outer surface of the second frame member 140. Referring to FIG. 1, for example, the adhesive may be disposed between an inner surface of the side wall portion 122 and a side wall of the bottom chassis 180 extended from a bottom plate portion thereof. Although not illustrated, the side wall of the bottom chassis 180 may be disposed between the side wall portion 122 of the first frame member 120 and the second frame member 140. Referring to FIG. 2, for example, the adhesive may be between an outer edge of the bottom chassis 180 and an inner surface of the side wall portion 122.

Figure 5:
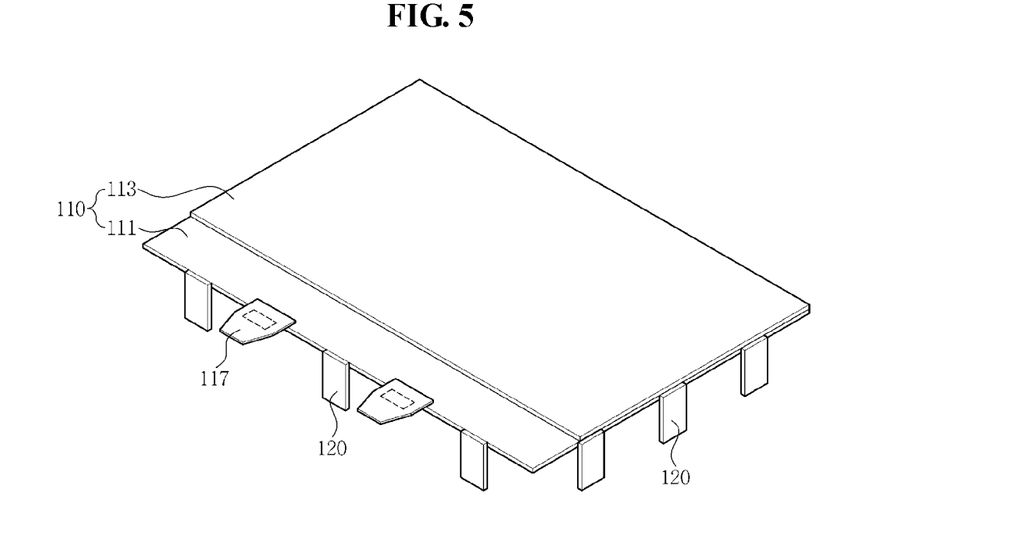
FIG. 5 is a perspective view illustrating another exemplary embodiment of a display panel according to the invention.

FIG. 5 is a perspective view illustrating another exemplary embodiment of a display panel 110 according to the invention.

In reference to FIG. 5, at least two first frame members 120 may be disposed on each of respective edge portions of the display panel 110. In FIG. 5, three first frame members 120 are disposed on each of the respective edge portions of the display panel 110, but the number of the first frame members 120 is not limited thereto. The attachment structure of the first frame member 120 and the display panel 110 described above is applicable to the first frame members 120 in FIG. 5, and further repeated description is omitted for convenience.

A length of the side wall portion 122 of the first frame member 120 may be smaller than a total length of the respective side of the display panel 110 at which the side wall portion 122 is disposed. A length of the fixing portion 121 extended from the side wall portion 122 may be substantially the same as the length of the side wall portion 122 or may extend substantially along the total length of the respective side of the display panel 110 at which the side wall portion 122 is disposed. Fixing portions 121 at different sides of the display panel 110 may be connected to each other but are not limited thereto.

Figure 6:
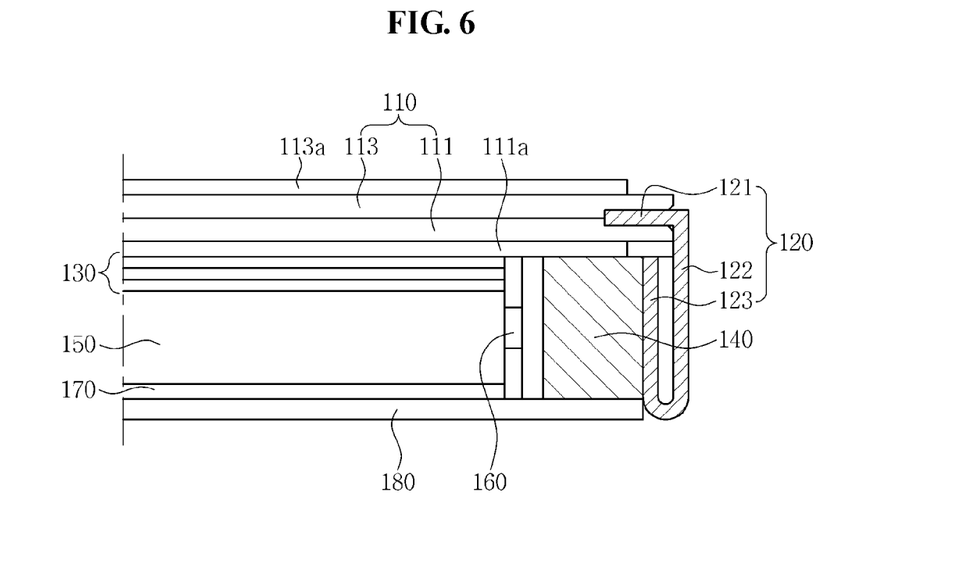
FIG. 6 is a cross-sectional view illustrating another exemplary embodiment of a display device according to the invention.

FIG. 6 is a cross-sectional view illustrating another exemplary embodiment of a display device 100 according to the invention. The cross-sectional view may be taken along line I-I' of FIG. 1.

In reference to FIG. 6, the first frame member 120 may further include a hemming portion 123 extending from the side wall portion 122 toward the second frame member 140 to be disposed between the side wall portion 122 of the first frame member 120 and the second frame member 140. The first frame member 120 may further define the hemming portion 123 thereof. The hemming portion 123 may be attached to at least one of the second frame member 140 and the bottom chassis 180 such as by using an adhesive member (not illustrated) interposed therebetween.

In the exemplary embodiment, the hemming portion 123 is defined as a single layer which is bent from the side wall portion 122, but is not limited thereto. The hemming portion 123 may be defined by a multi-layer structure in which the hemming portion 123 taken from the side wall portion 122 is bent a number of times to dispose the multiple layers thereof between the side wall portion 122 of the first frame member 120 and the second frame member 140.

A length of the hemming portion 123 of the first frame member 120 may be smaller than a total length of the respective side of the display panel 110 at which the side wall portion 122 is disposed. A length of the fixing portion 121 extended from the side wall portion 122 may be substantially the same as the length of the side wall portion 122 or may extend substantially along the total length of the respective side of the display panel 110 at which the side wall portion 122 is disposed. Fixing portions 121 at different sides of the display panel 110 may be connected to each other but are not limited thereto.

Referring again to FIG. 1, the optical sheet 130 is disposed on the light guide plate 150 and configured to diffuse and/or collimate light directed from the light guide plate 150. The optical sheet 130 may collectively include a diffusion sheet, a prism sheet and/or a protective sheet. While three optical sheets 130 are illustrated in FIG. 1, two or four optical sheets 130 may be provided.

The diffusion sheet may diffuse light incident from the light guide plate 150 to prevent partial concentration of the light.

The prism sheet may include prisms having a triangular cross-section and arranged in a predetermined array on one surface thereof. The prism sheet may be disposed on the diffusion sheet and may collimate light diffused from the diffusion sheet in a direction perpendicular to the display panel 110.

The protective sheet may be disposed on the prism sheet and may serve to protect a surface of the prism sheet and diffuse light to achieve uniform light distribution.

The second frame member 140 has a quadrangular loop shape, and is configured to support the display panel 110 thereon and to accommodate therein the optical sheet 130 and the light guide plate 150 disposed on an edge portion of the rear surface of the display panel 110. The second frame member 140 may be provided as a single unit as illustrated in FIG. 1, but in an alternative exemplary embodiment, the second frame member 140 may be defined by a plurality of units assembled to each other.

The light guide plate 150 may uniformly direct light provided from the light source unit 160 to the display panel 110. The light guide plate 150 is disposed adjacent to the light source unit 160, and is accommodated in the bottom chassis 180. The light guide plate 150 may be provided as a quadrangular plate, but is not limited thereto. When a light emitting diode ("LED") chip is used as a light source of the light source unit 160, the light guide plate 150 may have various forms defined therein or thereon including predetermined grooves, protrusions, or the like depending on the position of the light source.

Although referred to as a plate such as having a relatively large cross-sectional thickness for ease of description, the light guide plate 150 may be in a shape of a sheet or a film for which the cross-sectional thickness is smaller than that of the plate and is relatively small as compared to the planar size thereof, thereby achieving a relatively slim display device. In other words, the light guide plate 150 is to be understood as having a concept including the plate and the film which guides light provided from the light source unit 160.

The light guide plate 150 may include a light-transmissive material including, for example, acrylic resins, such as polymethylmethacrylate ("PMMA"), or polycarbonate ("PC") so as to guide light efficiently.

The light source unit 160 may include a light source 161 and a circuit board 163 on which the light source 161 is disposed. The light source 161 may be disposed at an edge portion or on a light incident side portion of the light guide plate 150. In other words, the light source 161 may emit light toward a corner portion or a linear light incident side portion of the light guide plate 150. The light source 161 may include at least one LED chip (not illustrated) and a package (not illustrated) which accommodates the LED chip therein. In an exemplary embodiment, for example, the LED chip (not illustrated) may be a gallium nitride (GaN)-based LED chip that emits blue light.

The number of the light source 161 may vary in consideration of size and luminance uniformity of the display panel 110. The circuit substrate 163 may include a printed circuit board ("PCB") or a metal PCB.

Referring to FIG. 2 and FIG. 6, the light source unit 160 is omitted for convenience of illustration. In an exemplary embodiment, the light source unit 160 may be disposed between the second frame member 140 and the light guide plate 150 but is not limited thereto.

The reflective sheet 170 is disposed between the light guide plate 150 and the bottom chassis 180. The reflective sheet 170 is configured to reflect light emitted downwards from the light guide plate 150 to be re-directed toward the display panel 110, thereby improving light efficiency.

The reflective sheet 170 may include, for example, polyethylene terephthalate ("PET"), and may reflect light. A surface of the reflective sheet 170 may be coated with a diffusion layer including, for example, titanium dioxide. The reflective sheet 170 may include materials containing metal, such as silver (Ag).

Although not illustrated, a wavelength conversion unit (not illustrated) may further be disposed between the light guide plate 150 and the light source unit 160. The wavelength conversion unit (not illustrated) may include a substance capable of changing wavelength of light. In an exemplary embodiment, for example, the wavelength conversion unit may change a wavelength of blue light emitted from a blue LED light source, so that the blue light may be converted to white light.

In addition, although not illustrated in FIG. 1, a heat dissipating member (not illustrated) may be disposed between the light source unit 160 and the bottom chassis 180. The heat dissipating member may release heat generated from the light source unit 160 to the outside. When the light source unit 160 is disposed on one side portion of the bottom chassis 180 in a bar or line shape, a metal frame having a bar or line shape may be disposed as the heat dissipating member. Accordingly, the heat dissipating member may have various shapes according to the shape of the light source unit 160.

The bottom chassis 180 may include or be formed of a relatively rigid metal material, such as stainless steel, or a material having good heat dissipation properties, such as aluminum or an aluminum alloy. The bottom chassis 180 is responsible for maintaining an overall framework of the display device and protecting a variety of elements accommodated thereon.

Figure 7:
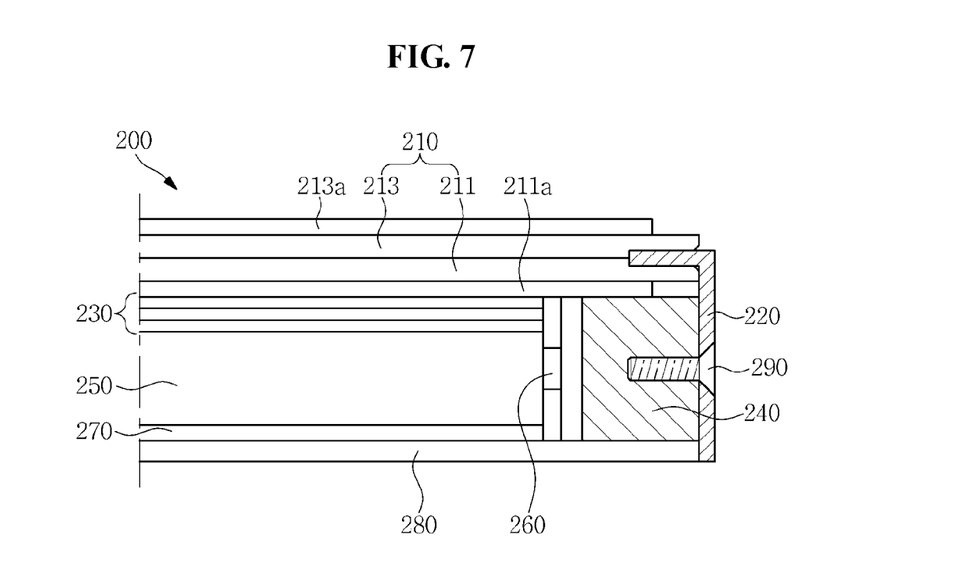
FIG. 7 is a cross-sectional view illustrating still another exemplary embodiment of a display device according to the invention.

FIG. 7 is a cross-sectional view illustrating still another exemplary embodiment of a display device according to the invention. The cross-sectional view may be taken along line I-I' of FIG. 1.

In reference to FIG. 7, the display device 200 includes a display panel 210, a first frame member 220, an optical sheet 230, a second frame member 240, a light guide plate 250, a light source unit, a reflective sheet 270 and a bottom chassis 280.

In addition, the display panel 210 includes a first display substrate 211, a second display substrate 213, an upper polarizer 213a and a lower polarizer 211a.

The repeated description described in the foregoing with respect to the display device 100 of FIG. 1 will be omitted in the description with respect to the display device 200 of FIG. 7.

In reference to FIG. 7, the display device 200 may further include a coupling member 290.

The coupling member 290 is a male screw, and the first frame member 220 and the second frame member 240 have a groove defined therein to which the coupling member 290 is engaged. The second frame member 240 may define the groove thereof.

The coupling member 290 may be engaged to the groove to fix the first frame member 220 coupled to the display panel 210 to the second frame memer 240.

Although not illustrated, the coupling member 290 may further include a nut.

Figure 8:
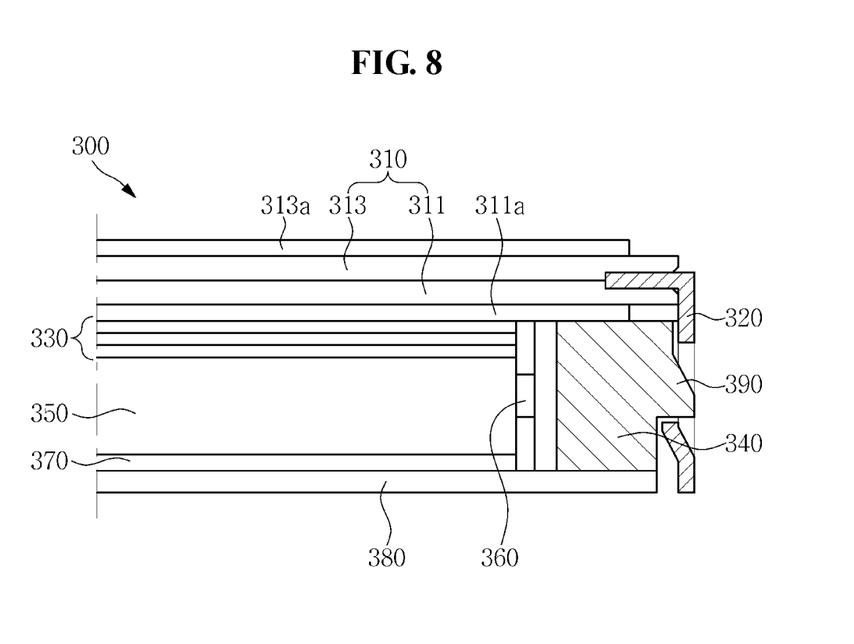
FIG. 8 is a cross-sectional view illustrating yet another exemplary embodiment of a display device according to the invention.

FIG. 8 is a cross-sectional view illustrating yet another exemplary embodiment of a display device according to still another exemplary embodiment.

The display device 300 includes a display panel 310, a first frame member 320, an optical sheet 330, a second frame member 340, a light guide plate 350, a light source unit, a reflective sheet 370 and a bottom chassis 380.

In addition, the display panel 310 includes a first display substrate 311, a second display substrate 313, an upper polarizer 313a and a lower polarizer 311a.

The repeated description described in the foregoing with respect to the display device 100 of FIG. 1 will be omitted in the description with respect to the display device 300 of FIG. 8.

In reference to FIG. 8, a coupling member 390 may be a hook defined by the second frame member 340.

The hook 390 may protrude from an exterior side surface of the second frame member 340 toward the first frame member 320. A hook coupling hole is defined in the first frame member 320 corresponding to the hook 390, and the first frame member 320 and the second frame member 340 are coupled to each other through the hook coupling hole such as in an assembly process.

Referring to FIG. 8, for example, the hook 390 may protrude having a triangular horizontal cross-section configured to be coupled to the first frame member 320 through the hook coupling hole defined therein, and may not be detached therefrom after being coupled thereto. The hook 390, for example, may be provided in a plural group including two or three hooks 390 that are spaced apart from one another at a predetermined interval along a length of the second frame member 340. The hooks 390 may be provided in one-to-one correspondence with a side wall portion of the first frame member 320 or may be provided in plural with respect to one side wall portion of the first frame member 320.

Further, a thickness of the second frame member 340 may at the hook 390 is greater than a thickness of a remaining portion of the second frame member 340 such as at portions adjacent to the hook 390. Referring to FIG. 8, for example, thicknesses of the second frame member 340 are taken in the horizontal direction. Thicknesses of portions of the second frame member 340 above and below the hook 390 are smaller than the thickness of the hook 390. A length of the hook 390 and the hook coupling hole are extended along a length of the respective side of the display panel 310 at which the first frame member 320 is disposed.

However, the number and shape of the hook 390 is not limited thereto, and any hooking means may be applicable.

In one or more exemplary embodiment of the invention, a display panel includes a display area in which an image is displayed and a non-display area in which an image is not displayed. In a top plan view, since both the first and second frame members overlap the non-display area of the display panel, the non-display area may be minimized to reduce a bezel of a display device. For example, in the top plan view of a display device, where only an outermost portion of the first frame member is exposed by the display panel while a remaining portion of the first frame member overlaps the display panel, the non-display area may be minimized to reduce the bezel of the display device. The exposed portion of the first frame member may define a border of the display device. A thickness of the first frame member may define the border of the display device.

As set forth above, according to exemplary embodiments, the LCD device having a narrow bezel may be provided and virtually borderless display device for which a border between a display screen thereof and a frame member thereof may be achieved.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
    a display panel comprising a first display substrate and a second display substrate opposing each other;
    a first frame member overlapping an edge portion of the display panel; and
    a second frame member at the edge portion of the display panel and on a rear surface of the display panel,
    wherein the first frame member defines:
        a fixing portion thereof extended between an edge portion of the first display substrate and an edge portion of the second display substrate, and
        a side wall portion thereof extended bent downwards from the fixing portion.

2. The display device of claim 1, further comprising
    a bottom chassis on which the second frame member is disposed, and
    a first adhesive member between the side wall portion of the first frame member and at least one of the second frame member and the bottom chassis.

3. The display device of claim 2, further comprising a second adhesive member between the fixing portion of the first frame member and at least one of the first display substrate and the second display substrate.

4. The display device of claim 3, wherein at the edge portion of the display panel,
    at least one of the first display substrate and the second display substrate has a reduced thickness, and
    the reduced thickness contacts the fixing portion overlapping the edge portion of the first display substrate of the display panel.

5. The display device of claim 4, wherein a total thickness of the first frame member is about 0.1 millimeter or more.

6. The display device of claim 5, wherein the first frame member is disposed outside the sealant which couples the first and second display substrates to each other.

7. The display device of claim 6, wherein
    the display panel defines the edge portion thereof in plural, and
    the first frame member is provided in plural respectively at the edge portions of the display panel.

8. The display device of claim 6, wherein the first frame member further defines a hemming portion extending from the side wall portion of the first frame member toward the second frame member to be disposed between the side wall portion of the first frame member and the second frame member.

9. The display device of claim 6, further comprising a backlight unit which is below the display panel and generates and provides light to the display panel.

10. The display device of claim 6, further comprising a coupling member which couples the first frame member and the second frame member to each other.

11. The display device of claim 10, wherein
    the second frame member defines a groove in which the coupling member is received, and
    the coupling member is a screw.

12. The display device of claim 10, wherein
    the second frame member defines the coupling member as a coupling hook, and
    the first frame member defines a coupling hole in which the coupling hook is received.

13. The display device of claim 1, wherein a portion of the fixing portion overlapping the edge portion of the first display substrate of the display panel is exposed by the display panel in a top plan view.

14. The display device of claim 1, wherein
    the display panel defines the edge portion thereof in plural and the first frame member defines the fixing portion thereof in plural,
    at a first edge portion of the display panel, a first fixing portion is extended between the edge portion of the first display substrate and the edge portion of the second display substrate, and
    at a second edge portion of the display panel different from the first edge portion, a portion of the first display substrate is exposed by the second display substrate, and a second fixing portion overlaps only an edge portion of the exposed first display substrate of the display panel.

15. The display device of claim 1, wherein the first frame member is provided in plural at the edge portion of the display panel.

16. The display device of claim 15, wherein
    the display panel defines the edge portion thereof in plural, and
    the first frame member is provided in plural for each edge portion of the display panel.

* * * * *